UNITED STATES PATENT OFFICE.

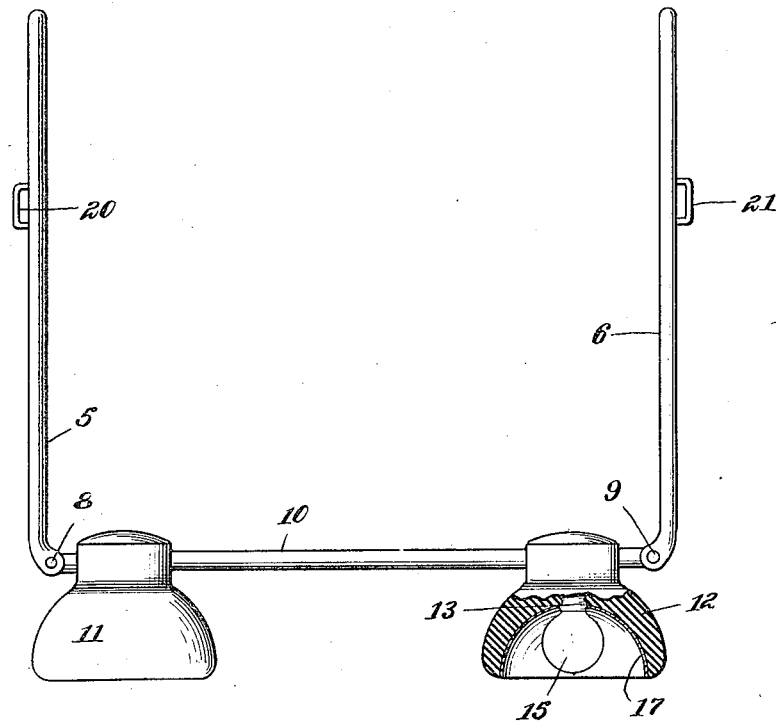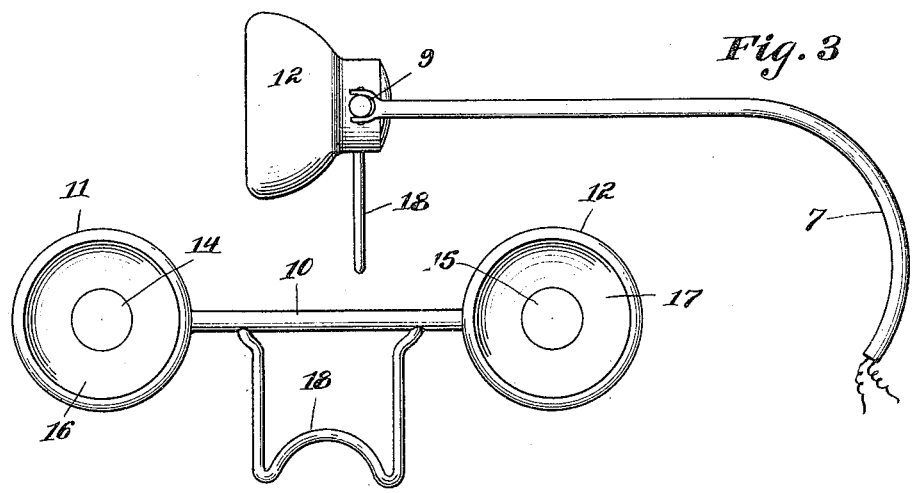

HENRY LA VINE, OF ROCHESTER, NEW YORK.

PORTABLE ELECTRIC LIGHT.

1,261,824.  Specification of Letters Patent.  Patented Apr. 9, 1918.

Application filed April 4, 1917. Serial No. 159,695.

*To all whom it may concern:*

Be it known that I, HENRY LA VINE, a citizen of the United States, residing at Rochester, in the county of Monroe and State of New York, have invented new and useful Improvements in Portable Electric Lights, of which the following is a specification.

This invention is a portable electric light which is adapted to be worn when reading or working so that the light may be thrown to the proper point at all times.

One object of the invention is to provide a light-weight frame, whose general shape is that of a spectacle frame, and is adapted to carry electric conducting wires to suitable lamps that are spaced apart in accordance with the usual eye spacing of a human being.

Another object is to provide a frame of such construction that it may be readily applied and easily worn by the user without discomfort, and will in no way interfere with his wearing glasses at the same time.

A further object is to provide reflectors for the lamps, the reflectors being carried by the frame in such a manner that the light is projected to the desired spot, thus leaving the hands free.

The invention, broadly stated, comprises a frame which may be formed of tubular material, and consists of temple bars, suitable ear loops, a cross member, a nose piece depending from the cross member, electric lamps including sockets and reflectors carried by the cross member, said lamps and reflectors being spaced apart on the cross member in accordance with the usual eye spacing, said ear loops being provided with a hinged joint or connection where they are attached to the cross member, and said frame and cross member being tubular and adapted to act or serve as conduits for the conducting wires.

A practical form of the invention will be described and illustrated in the accompanying drawing, in which:—

Figure 1 is a top plan view;

Fig. 2 is a front elevation; and

Fig. 3 is a side elevation.

The preferred embodiment consists of a spectacle frame having temple bars 5 and 6, which terminate in the ear loops, one of which is indicated at 7 in Fig. 3. The forward ends of the temple bars 5 and 6 are provided with hinge connections indicated at 8 and 9. These connections or joints may be of the usual or customary type.

Extending across the front end in coöperative relation with the joints is a cross bar or member 10, upon which are mounted suitable receptacles 11 and 12 for carrying the usual type of lamp sockets indicated at 13. To coöperate with the sockets the lamps 14 and 15 are provided. These lamps may be of any usual type.

Secured to the receptacles 11 and 12 are reflectors 16 and 17, which may be formed of any material suitable for the purpose of reflecting the rays of light emanating from the lamps.

Depending from the cross member 10 is a bridge or nose piece 18, which may partake of the usual or customary form or shape.

The temple bars, including their ear loops and cross member, being tubular in form are thus adapted to serve as conduits for conducting wires 19, as shown in Fig. 3. To hold the temple bars in their proper position, loops 20 and 21 are provided on the bars so that a strap (not shown) may be passed therethrough and coöperate with the top of the head or with the chin.

To use this invention the temple bars 5 and 6 are opened and the frame is positioned upon the face of the wearer in a manner similar to that of the ordinary type of spectacle. The ear loops are then passed around and secured behind the ears, at which time the nose piece 18 will rest upon the bridge of the nose in its usual place.

As shown in Fig. 2, the nose or bridge piece extends downward from the cross member 10 a sufficient distance so that the cross member carries the lamps and the reflectors above the eyes. The lamps being spaced apart to correspond with the spacing of the eyes permits the light to be reflected in substantially the same direction as the wearer is looking, and the fact that the nose piece 18 is quite tall results in the lamps being raised to a point over the wearer's brow or forehead, well above glasses in case he is wearing them at the same time. Thus if the work to be inspected is very fine and calls for the use of lenses of high power, he can put on an appropriate pair of glasses without interfering with this apparatus, and switch on the lights in the latter to illuminate the work being inspected.

To secure the frames against movement a suitable strap may be employed which passes through the loops 20 and 21 over the top of the head or under the chin.

The conducting wires, as indicated in Fig. 3, may be connected in any convenient way to a source of electric supply, such as a pocket battery that may be carried by the user.

Minor changes in the form, proportions, and details of construction may be resorted to without departing from the spirit of the invention or the scope of the appended claim.

What is claimed is:—

The herein described portable electric light comprising a frame of spectacle shape including temple bars, a cross-bar to which they are pivoted, and a nose-piece depending rigidly from the center of the cross-bar a distance sufficient to raise the bar to a point opposite the wearer's forehead; a pair of electric bulbs and their sockets and reflectors carried by said cross bar, and wires leading from the bulbs and adapted to be connected with a source of electric energy.

In testimony whereof I affix my signature.

HENRY LA VINE.

Copies of this patent may be obtained for five cents each, by addressing the "Commissioner of Patents, Washington, D. C."